(No Model.)

E. G. FELTHOUSEN.
Valve Stem for Cocks and Valves.

No. 228,991. Patented June 22, 1880.

Witnesses:
Michael J Stark,
Frank Hirsch.

Inventor:
Ed. G. Felthousen,
by Michael J Stark,
Attorney.

UNITED STATES PATENT OFFICE.

EDWARD G. FELTHOUSEN, OF BUFFALO, NEW YORK.

VALVE-STEM FOR COCKS AND VALVES.

SPECIFICATION forming part of Letters Patent No. 228,991, dated June 22, 1880.

Application filed March 30, 1880. (No model.)

*To all whom it may concern:*

Be it known that I, EDWARD G. FELTHOUSEN, of Buffalo, in the county of Erie and State of New York, have invented certain new and useful Improvements in Valve-Stems for Cocks and Valves; and I do hereby declare that the following description of my said invention, taken in connection with the accompanying sheet of drawings, forms a full, clear, and exact specification, which will enable others skilled in the art to which it appertains to make and use the same.

This invention has general reference to valve-stems for valves and cocks; and it consists in the peculiar combination, with said stems, of means, substantially as hereinafter first fully set forth and described, and then pointed out in the claims, whereby the valve, consisting of an elastic plug, may be expanded and readily adjusted for compensation of wear and other purposes.

Figure 1:
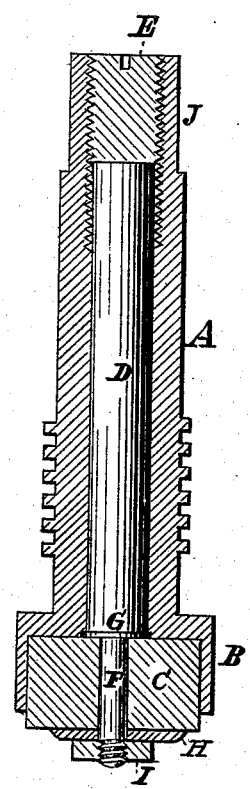
Figure 2:
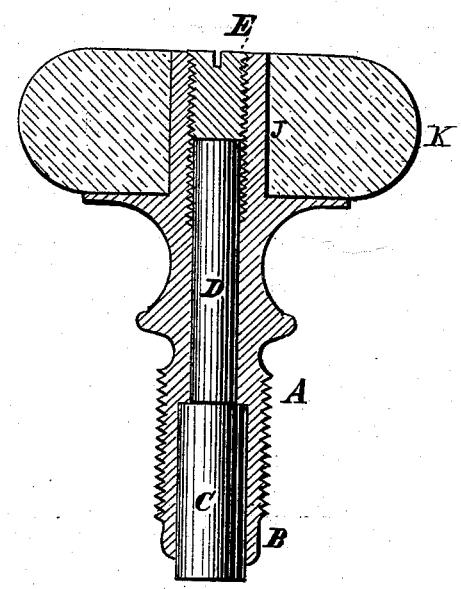

In the drawings already referred to, which serve to illustrate my said invention more fully, Figure 1 is a longitudinal sectional elevation of a globe-valve stem, and Fig. 2 a similar view of a so-called "compression gage-cock stem."

Like parts are designated by corresponding letters of reference in both figures.

A is the screw-spindle of a valve or cock having centrally a longitudinal aperture screw-threaded in its upper end for the reception of a correspondingly screw-threaded plug, E, and fitted with a push-rod, D. The lower end of this screw-spindle A is provided with a housing, B, into which is loosely placed a valve, C. This valve consists of some flexible and expansible material, such as rubber, lead, antifriction or other metal or material, and it has centrally an aperture for the passage of a bolt, F, the head G of which is on the top and the nut I on the bottom or bearing-surface of said valve, a metallic washer, H, being placed between said nut and the bearing-surface of said valve to reduce friction, and to avoid wear when the nut is being screwed tight.

In cocks and valves having screw-spindles to bring the valve down upon its seat there are several difficulties and drawbacks, viz: When the parts are all of metal the greatest accuracy in manufacturing is required or the valve will not be tight, and refitting of such valves after continued use is very difficult to perform.

To overcome these objections, which is the object of my invention, I have introduced into the housing B a valve of flexible material, which, as is well known, is self-adjusting—that is to say, it, being flexible, will readily accommodate itself to any inequalities or other defects of the valve-seat, and under ordinary circumstances make a tight joint. This flexible valve, however, is liable to wear the same as any other valve, but its bearing-face is more readily renewed, since nothing remains to be done but to true-up its face and then reinsert the valve into its housing. This truing-up of the said bearing-surface has, however, the effect of shortening the valve; and to make up for this deficiency I have introduced the screw-plug E and push-rod D into the spindle A, so that by screwing said plug E farther into the spindle A the rod D will push the valve C out of its housing B sufficiently to compensate for the shortening of said valve occasioned by the truing-up of its bearing-face.

The construction of this device requires the valve C to be movable within its housing B, but at the same time be held sufficiently tight therein to prevent it from falling out of the same. I have, therefore, provided the valve C with the central aperture already mentioned, and passed the screw-bolt F into said aperture, so that by screwing up the nut I the valve will be compressed between the head G and washer H, and thereby increased in diameter, thus enabling me to always adjust the external size of the valve to closely fit its housing B.

The head G of said bolt F serves, in addition to its described purpose, as a base for the push-rod D to receive the pressure of the valve when being screwed down upon its seat. For this reason said head is made as large in diameter as circumstances will permit.

It will be readily observed that the device described is easily applied to all the various kinds of cocks and valves having screw-spindles, by which said valves are opened and closed.

Having thus fully described my invention,

I claim as new and desire to secure to me by Letters Patent of the United States—

1. A valve-spindle having a housing, B, and a longitudinal central aperture fitted with a push-rod, D, and a screw-plug, E, in combination with an elastic valve, C, fitted into said housing B, the spindle A having an external screw-thread, substantially in the manner as and for the object specified.

2. In cocks and valves having an elastic valve removably retained in its housing by frictional contact only, the combination, with the spindle A, having the housing B, of the elastic valve C, provided with the bolt F, having its head G on the top and nut I on the bottom surface of said valve, whereby by screwing up the nut I the diameter of said valve is increased and the valve closely fitted to the housing, substantially as and for the object specified.

In testimony that I claim the foregoing as my invention I have hereto set my hand in the presence of two subscribing witnesses.

EDWARD G. FELTHOUSEN.

Attest:
MICHAEL J. STARK,
FRANK HIRSCH.